(12) United States Patent
Pavlov et al.

(10) Patent No.: US 6,471,618 B2
(45) Date of Patent: Oct. 29, 2002

(54) TORQUE BIASING DEVICE, SPEED MATCHING DEVICE AND CONTROL METHODS

(75) Inventors: Kevin Jerome Pavlov, Livonia, MI (US); Richard Michael Krzesicki, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 93 days.

(21) Appl. No.: 09/819,870

(22) Filed: Mar. 28, 2001

(65) Prior Publication Data

US 2002/0142883 A1 Oct. 3, 2002

Related U.S. Application Data

(60) Provisional application No. 60/204,414, filed on May 16, 2000.

(51) Int. Cl.[7] ................................ F16H 15/16
(52) U.S. Cl. ........................................................ 476/52
(58) Field of Search ...................... 74/191, 690; 476/50, 476/52, 53; 475/230, 231, 233, 235, 249, 252

(56) References Cited

U.S. PATENT DOCUMENTS

| | | | | |
|---|---|---|---|---|
| 5,989,147 A | * | 11/1999 | Forrest et al. | 475/231 |
| 6,013,004 A | * | 1/2000 | Gage et al. | 475/249 |
| 6,254,505 B1 | * | 7/2001 | Forrest | 475/230 |
| 6,413,183 B1 | * | 7/2002 | Ishikawa et al. | 475/160 |

* cited by examiner

*Primary Examiner*—Christopher P. Schwartz
(74) *Attorney, Agent, or Firm*—John E. Kajander

(57) ABSTRACT

A torque biasing device, based on three friction cones and 2 friction rings, can provide differential outputs from a single mechanical input, by varying the interface of the rings to the cones and a speed matching device based on two cones, a friction ring and a clutch can provide smooth clutching operation for a driven shaft.

29 Claims, 5 Drawing Sheets

TORQUE BIASING DEVICE, SPEED MATCHING DEVICE AND CONTROL METHODS

CROSS REFERENCE TO RELATED APPLICATIONS

This application claims the benefit of U.S. Provisional Application No. 60/204,414 filed on May 16, 2000.

FIELD OF THE INVENTION

The present invention relates to torque biasing devices and speed matching devices and methods for controlling same, in particular to torque biasing and speed matching devices having output cones, whose torque is independently adjusted by the effect of friction rings interacting with an input cone.

BACKGROUND OF THE INVENTION

Common automotive differentials split torque between two different output axle shafts using a basic arrangement of pinion and side gears, driven by an input gear to split the input torque into two output torques for transmission to the wheels. This arrangement of gears does not provide for any substantial shifting, or biasing of the torque between the two wheels to meet different frictional conditions that each wheel may be experiencing. Individual wheels often experience intermittent, lower coefficients of friction caused by patches of ice, water, mud, gravel, loose dirt or broken pavement. A method of varying, or biasing the torque between two wheels can improve overall vehicle traction by providing more torque to a wheel that is gripping and less friction to a wheel that is slipping. Biasing can be accomplished using the mechanism described in this invention, combined with control strategies for detecting wheel slip well known to practitioners in the art.

Common automotive transmissions induce a lurch, or brief deceleration into the vehicle when engaging the input torque from the engine during a shift in gears. A method of matching the speeds of the engine output shaft and transmission input shaft can reduce or eliminate this lurch.

The present invention uses friction cone technology to bias torque between two separate output shafts and/or to match an output shaft speed with an input shaft speed. The basic friction cone is known from British Patent Number 298,676, and another friction cone application is known from U.S. Pat. No. 5,924,953. Additional references include the following U.S. Pat. Nos. 5,681,235; 4,957,474; 4,639,869; 3,820,408; 4,963,122; 5,688,201; 3,894,439; 4,229,985; 5597,056. All of these patents are incorporated herein by reference.

SUMMARY OF THE INVENTION

A first object and/or advantage of the invention is to provide a torque biasing device with active controls to allow the torque to be adjusted between two output shafts, as in an automobile differential.

A second object and/or advantage of the invention is to provide a speed matching device with active controls to allow the smooth matching of a driven output shaft to the speed of a driving input shaft, as in an automotive clutch matching the engine output shaft speed to the transmission input shaft speed during a clutching operation.

DETAILED DESCRIPTION OF THE PREFERRED EMBODIMENT OF THE INVENTION

The following list is provided to better understand the terms used:
(10) Input Cone
(20) Input Cone Axis
(30) Input Cone Taper Angle
(40) Input Cone Outer Surface
(50) First Output Cone
(60) First Output Cone Axis
(70) First Output Cone Taper Angle
(80) First Output Cone Outer Surface
(90) Second Output Cone
(100) Second Output Cone Axis
(110) Second Output Cone Taper Angle
(120) Second Output Cone Outer Surface
(130) First Friction Ring
(140) First Friction Ring Inner Surface
(150) First Friction Ring Outer Surface
(160) First Friction Ring Control Means
(170) Second Friction Ring
(180) Second Friction Ring Inner Surface
(190) Second Friction Ring Outer Surface
(200) Second Friction Ring Control Means
(210) First Friction Yoke
(220) First Yoke Plane
(230) First Yoke Slot or Groove
(240) First Friction Yoke Control Means
(250) Second Friction Yoke
(260) Second Yoke Plane
(270) Second Yoke Slot or Groove
(280) Second Friction Yoke Control Means
(290) First Control Frame
(300) First Control Frame Axis
(310) First Control Frame Pivot Bar
(320) First Control Frame Rail
(330) First Control Frame Pivot Bar Control Means
(340) Second Control Frame
(350) Second Control Frame Axis
(360) Second Control Frame Pivot Bar
(370) Second Control Frame Rail
(380) Second Control Frame Pivot Bar Control Means
(390) First Friction Ring Pivot Yoke
(400) First Pivot Yoke Plane
(410) First Pivot Yoke Slot
(415) First Pivot Yoke Rod
(420) First Pivot Yoke Axis
(430) First Pivot Yoke Axis Control Means
(440) Second Friction Ring Pivot Yoke (450) Second Pivot Yoke Plane
(460) Second Pivot Yoke Slot
(465) Second Pivot Yoke Bar
(470) Second Pivot Yoke Axis
(480) Second Pivot Yoke Axis Control Means
(490) Torque Biasing Device Case
(500) Liquid
(510) First Pinion Gear
(520) First Pinion Gear Axis
(530) First Pinion Gear Teeth
(540) First Side Gear
(550) First Side Gear Axis
(560) First Side Gear Teeth
(570) Second Pinion Gear
(580) Second Pinion Gear Axis
(590) Second Pinion Gear Teeth
(600) Second Side Gear
(610) Second Side Gear Axis
(620) Second Side Gear Teeth
(630) First Pinion Gear
(640) First Pinion Gear Axis
(650) First Pinion Gear Teeth
(660) First Output Shaft
(670) First Output Shaft End of First Output Shaft
(680) Second Output Shaft End of First Output Shaft
(690) First Side Gear
(700) First Side Gear Axis
(710) First Side Gear Teeth
(720) First Axle Shaft
(730) First Axle Shaft End of First Axle Shaft
(740) Second Pinion Gear
(750) Second Pinion Gear Axis
(760) Second Pinion Gear Teeth
(770) Second Output Shaft
(780) First Output Shaft End of Second Output Shaft
(790) Second Output Shaft End of Second Output Shaft
(800) Second Side Gear
(810) Second Side Gear Axis
(820) Second Side Gear Teeth
(830) Second Axle Shaft
(840) First Axle Shaft End of Second Axle Shaft
(850) Second Axle Shaft End of Second Axle Shaft
(860) Input Cone
(870) Input Cone Axis
(880) Input Cone Taper Angle
(890) Input Cone Outer Surface
(900) Output Cone
(910) Output Cone Axis
(920) Output Cone Taper Angle
(930) Output Cone Outer Surface
(940) Friction Ring
(950) Friction Ring Inner Surface
(960) Friction Ring Outer Surface
(970) Clutch
(980) Driven Shaft In FIG. 1, there is shown a perspective view of one possible layout of a three cone differential torque biasing device. Torque is transmitted by the input cone (10) through the input cone outer surface (40) to the outer surface of the first (130) and second (170)friction rings. The first friction ring (130) transfers the torque to the first output cone (50) through the contact between the first friction ring inner surface (140) and the first output cone outer surface (80). Likewise, the second friction ring (170) transmits the torque through the second friction ring inner surface(180) to the second output cone outer surface (120). By controlling the placement of the first friction ring (130) and the second friction ring (170) independently one can vary the effective radii of the various cones and thus vary the amount of torque transferred to each output cone independently.

Figures 1, 2, 3:
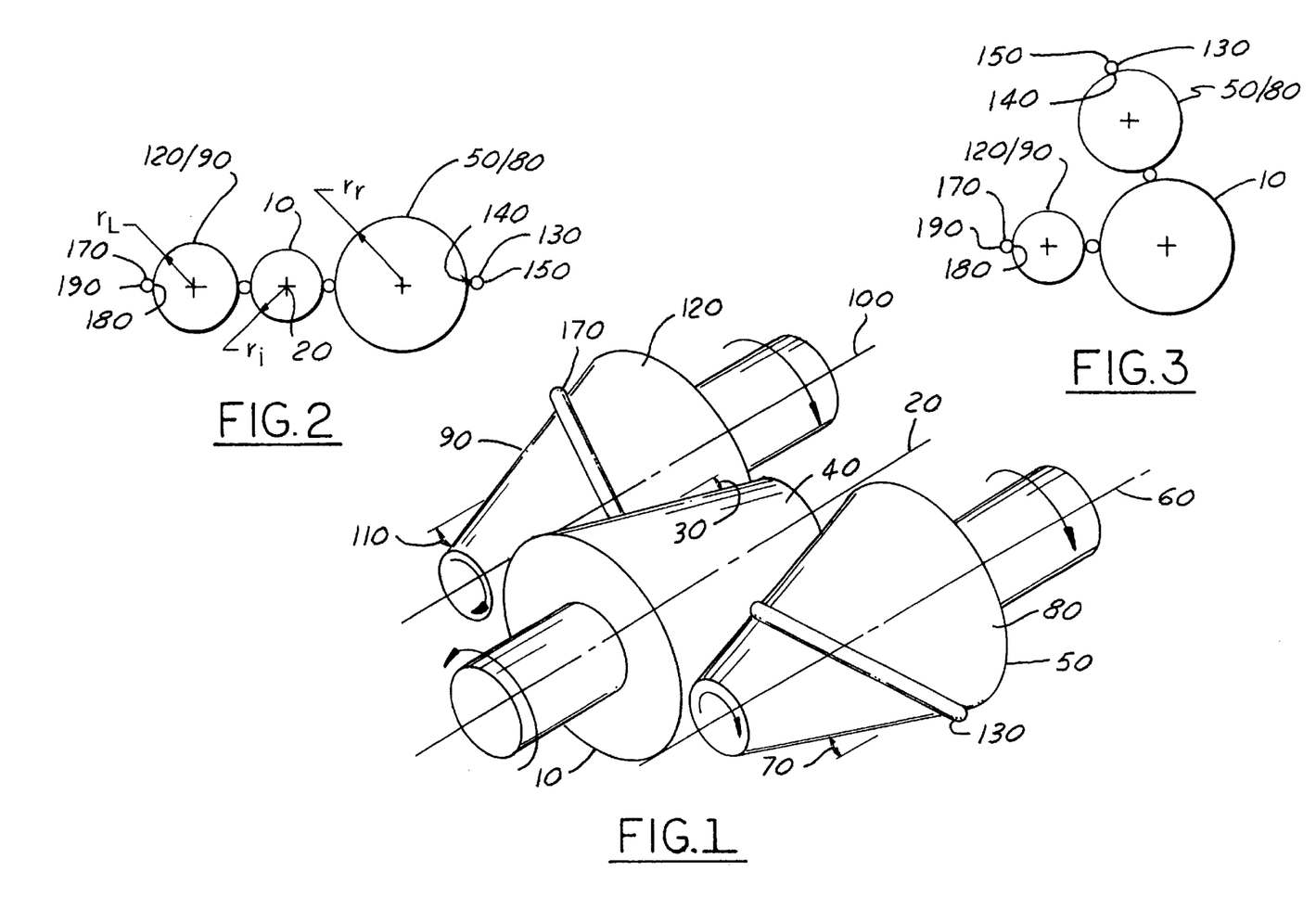
FIG. 1 is a perspective view of one embodiment of the claimed torque biasing device.
FIG. 2 is one possible cross section view taken perpendicular to the cones' axes.
FIG. 3 is another possible cross section view taken prependicular to the cones' axes.

The normal force and resulting friction between the respective cone surfaces and the friction rings may be modified by moving the input cone (10) along the input cone axis (20) toward or away from one or both of the two output cones (50 and/or 90); by moving any one or both of the two output cones (50 and/or 90) along their respective axis (60 and/or 100) toward or away from the input cone (10) or by moving all three cones (10, 50 and/or 90) along their respective axis (20, 60 and/or 100) to vary the normal force exerted by the respective cone surfaces (40, 80 and/or 120) upon either one or both of the friction rings (130 and/or 170).

The torque experienced by either of the two output cones (50 and/or 90) may be increased or decreased with the addition of first and second torque inducer means. These torque inducer means may be mechanical, hydraulic, electromechanical or any other means for inducing added torque or inhibiting torque in the output cones (50 and/or 90) and their respective output shafts, used by practitioners in the art.

In FIG. 2, a cross section view is taken normal to the first friction ring (130) and second friction ring (170). This cross section shows how the effective radii ($r_l$, $r_i$,$r_r$) of the three cones vary as the placement of the friction rings vary. FIG. 2 also illustrates one possible layout of the input cone (10), the first output cone (50) and the second output cone (90).

FIG. 3 shows another possible layout of the input cone (10), the first output cone (50) and the second output cone (90). FIG. 3 also shows how the effective radii of the three friction cones change when the placement of the first friction ring (130) and the second friction ring (170) is varied. Note that the input cone's (10) effective radius does not have to be the same with respect to the first output cone (50) and the second output cone (90) even though it is shown this way in the illustration. Each output cone will experience a different effective radius for the input cone (10) based on where that output cone's friction ring outer surface (150 and 190) meets the outer surface of the input cone (40) along the input cone axis (20).

Figure 4:
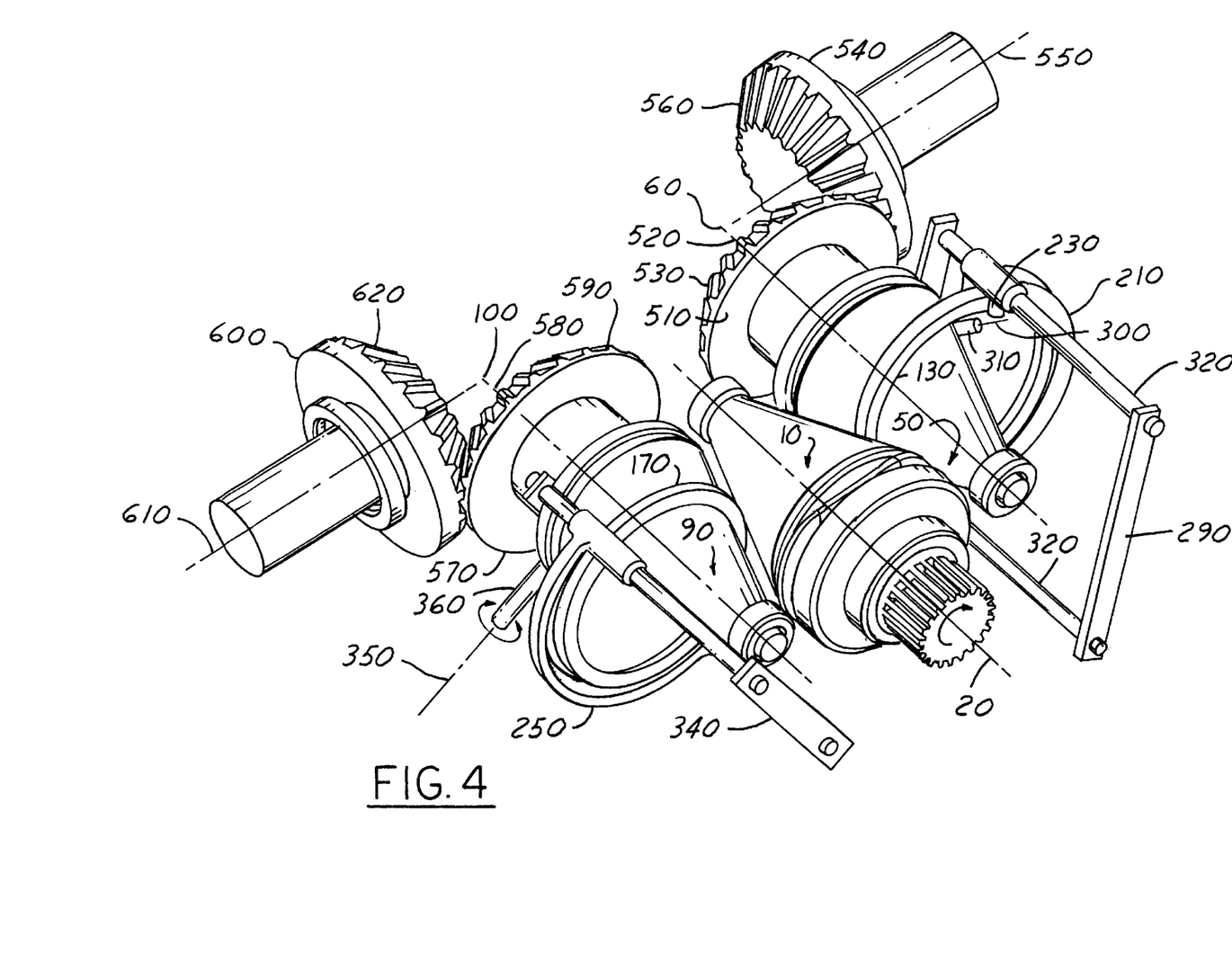
FIG. 4 is a perspective view of another embodiment of the claimed torque biasing device.

A control means for the friction rings (130 and 170) could be based on the use of two friction ring yokes (210 and 250) slidably attached to rails (320 and 370) of control frames (290 and 340) (see FIG. 4). The friction ring yokes (210 and 250) are responsible for keeping the friction rings (130 and 170) in specific controlled friction yoke planes (220 and 260). The position of the friction rings (130 and 170) as well as the friction yoke planes (220 and 260) along the input cone axis (20)can be independently controlled by sliding the friction yokes (210 and 250) along the control rails (320 and 370) of their respective control frames (290 and 340). Additionally, these control frames could be comprised of frame pivot bars (310 and 360) which pivot the frames independently about their respective control frame axis (300 and 350), thus allowing independent variation of the angle which each friction yoke plane (220 and 260) and thus each friction ring (130 and 170) interfaces with the input cone (10) and their respective output cones (50 and 90).

After the torque has been biased by the respective friction rings (130 and 170) and output cones (50 and 90), the torque can be transmitted to respective first and second pinion gears (510 and 570). The first and second pinion gears then engage respective first and second side gears (540 and 600) in order to deliver the torque along opposing axis (610 and 550).

Figure 5:
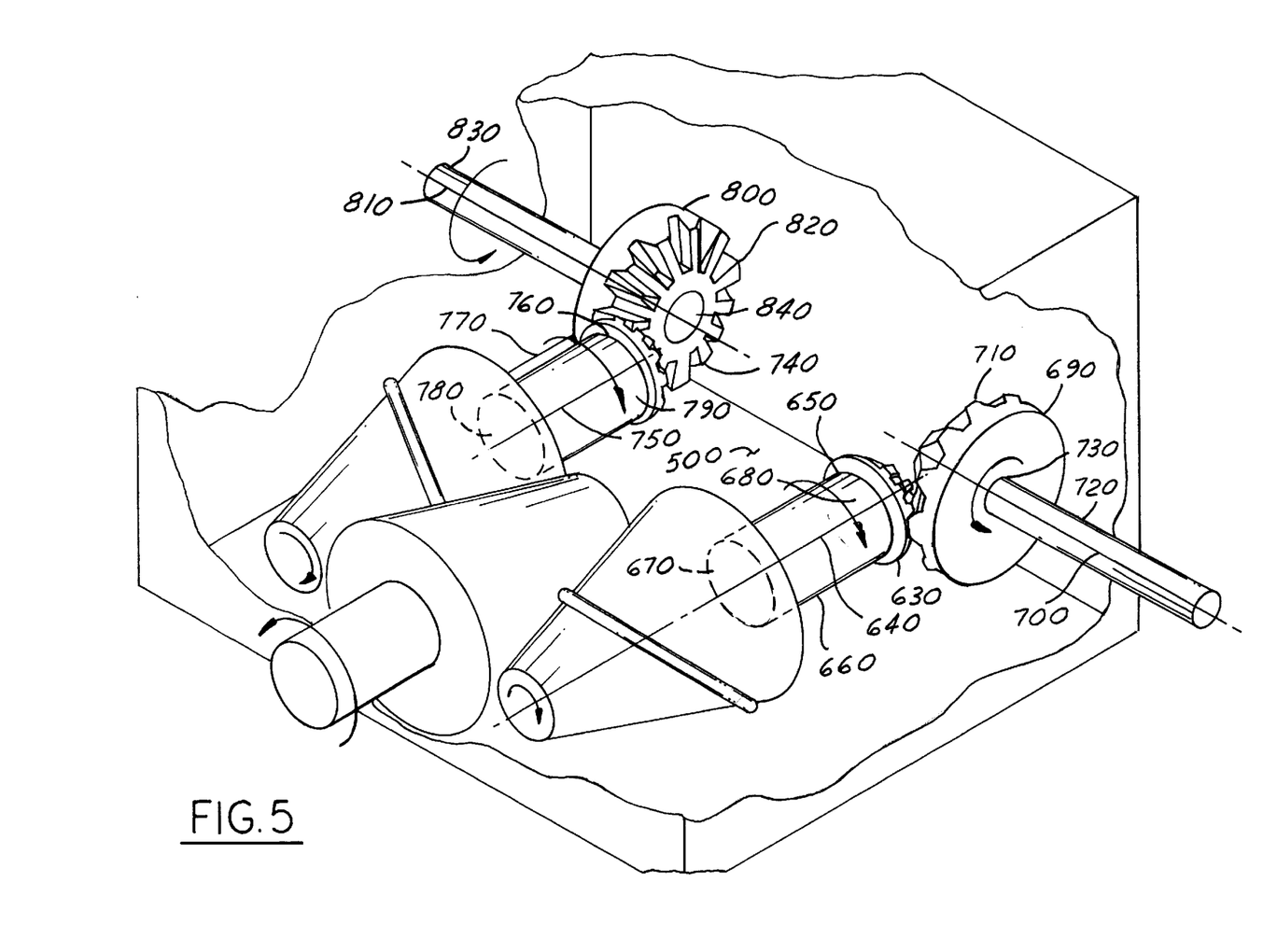
FIG. 5 is a perspective view of another embodiment of the claimed torque biasing device.

In FIG. 5, the device is shown enveloped in a liquid (500) which enhances the performance of the device and with the inclusion of first and second axle shafts (720 and 830). This application may be appropriate for an automotive differential for instance. Such liquid (500) may be of a lubricating nature, a cooling nature or of a nature to contribute to the friction forces between the friction rings (130 and 170) and the cone surfaces (40, 80 and 120). Such a liquid may combine features of lubricity cooling and viscosity at the same time to enhance performance of the device.

Figure 6:
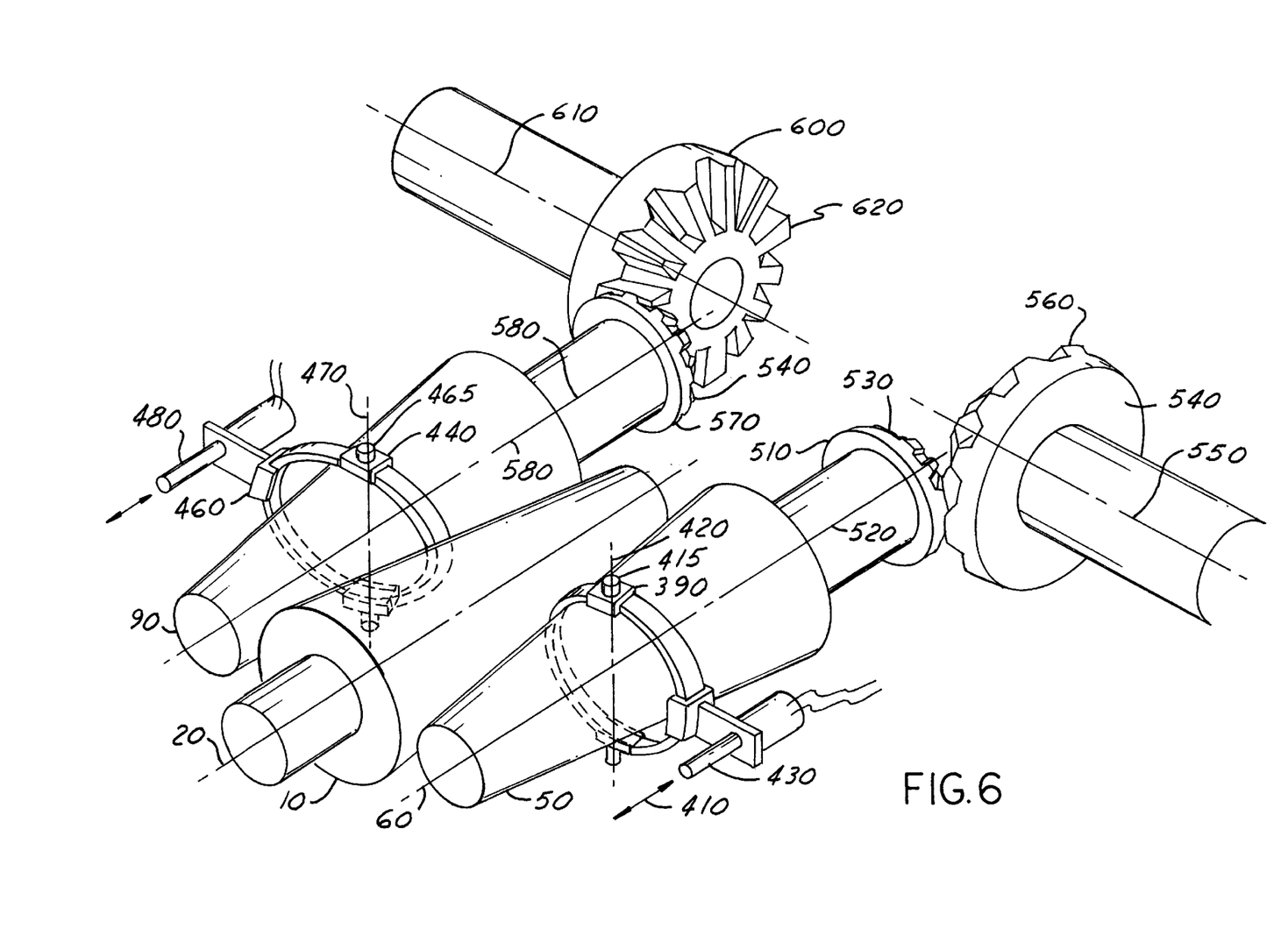
FIG. 6 is a perspective view of another embodiment of the claimed torque biasing device.

Another possible alternative friction ring control means is described in FIG. 6. There, the first and second friction rings (130 and 170) are independently controlled using first and second pivot yokes (390 and 440). These pivot yokes (390 and 440) confine the respective first and second friction rings (130 and 170) in first pivot yoke plane (400) and a second pivot yoke plane (450) respectively. The position where the first or second friction ring interfaces with the input cone (10) and either the first or second output cone (50 or 90) is controlled by pivoting the first or second pivot yokes (390 or 440) along with their respective first or second pivot yoke planes (400 or 450) and their respective first or second friction rings (130 or 170) along a first or second pivot yoke axis (420 or 470). All of this is accomplished through actuation of a first or second yoke control means (430 or 480).

Figures 7, 8:
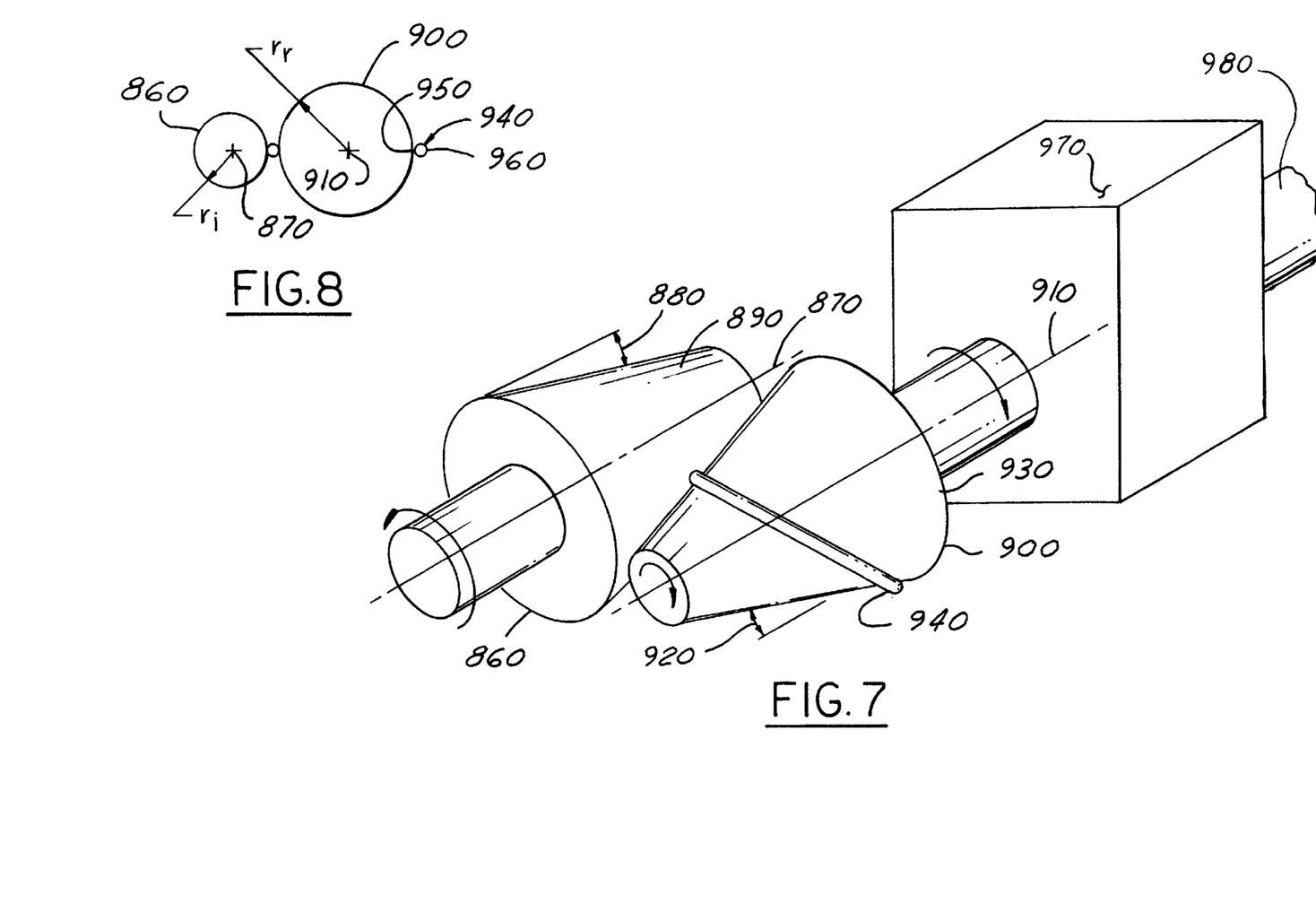
FIG. 7 is a perspective view of one embodiment of the claimed speed matching device.
FIG. 8 is a cross section view of one embodiment of the claimed speed matching device taken perpendicular to the cones' axes.

A device for matching speeds between two shafts (see FIG. 7) can be comprised of an input cone(860), an output cone(900), a friction ring (940) and a clutching device (970). The clutching device may be any of many clutch devices well known by practitioners in the art. The clutching device may even be something as simple as a means for separating the friction ring (940) from one of either the input cone outer surface (890) or the output cone outer surface (930). Note that the friction ring (940) may encircle either the output cone axis (910) or the input cone axis (870) in order for the device to work. From time to time and for various reasons, a driven shaft may need to be decoupled from a driving source. Once this happens, the rotational speed of the driving source and the driven shaft may change. If one wants to reconnect the driving source with the driven shaft, it may be preferable to do so in a smooth way so that no lurch or slip occurs in the driven shaft upon reconnection. One embodiment of the device allows for this by employing a input cone speed sensing device, an output cone speed sensing device a means for controlling the friction ring and a clutch controller. By varying the friction ring control means until the ratio of output speed to driven shaft speed substantially equal a predetermined variable, lurch or slip in the driven shaft upon reconnection can be substantially reduced or even eliminated. The predetermined speed matching optimization variable should be between and including 0.1 and 10 and preferably between and including 0.5 and 2.0.

What is claimed:

1. A torque biasing device comprising:
   (a) an input cone having an input cone axis, an input cone taper angle and an input cone outer surface;
   (b) a first output cone having a first output cone axis parallel to said input cone axis, a first output cone taper angle equal and opposite to said input cone taper angle, and a first output cone outer surface;
   (c) a second output cone having a second output cone axis parallel to said input cone axis, a second output cone taper angle, equal and opposite to said input cone taper angle, and a second output cone outer surface;
   (d) a first friction ring having a first friction ring inner surface or edge in contact with said first output cone outer surface, a first friction ring outer surface or edge in contact with said input cone outer surface;
   (e) a first friction ring control means for positioning said first friction ring along said first output cone outer surface;
   (f) a second friction ring having a second friction ring inner surface or edge in contact with said second output cone outer surface, a second friction ring outer surface or edge in contact with said input cone outer surface; and,
   (g) a second friction ring control means for positioning said second friction ring along said second output cone outer surface.

2. The torque biasing device of claim 1, wherein said input cone axis, said first output cone axis and said second output cone axis are not coplanar.

3. The torque biasing device of claim 1 wherein each of said first and second friction ring control means further comprises:
   (a) a first friction ring yoke having a first yoke plane and a first yoke slot or groove which fixes said first friction ring in said first yoke plane but allows said first friction ring to rotate about said first output cone axis;
   (b) a first friction ring yoke control means; for positioning said first yoke and said first fixed friction ring along said first output cone outer surface;
   (c) a second friction ring yoke having a second yoke plane and a second yoke slot or groove which fixes said second friction ring in said second yoke plane but allows said second friction ring to rotate about said second output cone axis; and,
   (d) a second friction ring yoke control means for positioning said second friction ring yoke and said fixed second friction ring along said second output cone outer surface.

4. The torque biasing device of claim 3 wherein said first and second friction ring yoke control means further comprise:
   (a) a first control frame having a first control frame axis, a first control frame pivot bar, and at least one first control frame rail which slidably fixes said first friction ring yoke along said first control frame axis;
   (b) a first control frame pivot bar control means;
   (c) a second control frame having a second control frame axis, a second control frame pivot bar, and at least one second control frame rail which slidably fixes said second friction ring yoke along said second control frame axis; and,
   (d) a second control frame pivot bar control means.

5. The torque biasing device of claim 1 wherein said first friction ring control means and said second friction ring control means each of which further comprise:
   (a) a first friction ring pivot yoke having a first pivot yoke plane and a first pivot yoke slot or groove which fixes said first friction ring in said first pivot yoke plane but allows said first friction ring to rotate about said first output cone axis;
   (b) a first pivot yoke rod, having a first yoke pivot axis;
   (c) a first yoke pivot axis control means for rotating said first pivot yoke rod about said first pivot yoke axis;
   (d) a second friction ring pivot yoke having a second pivot yoke plane and a second pivot yoke slot or groove which fixes said second friction ring in said second pivot yoke plane but allows said second friction ring to rotate about said second output cone axis;
   (e) a second yoke pivot rod having a second pivot yoke axis; and, (f) a second yoke pivot axis control means for rotating said second pivot yoke rod about said second pivot yoke axis.

6. The torque biasing device of claim 1 further comprising a torque biasing device case which encloses at least one of said input cone, said first output cone, said second output cone, said first friction ring or said second friction ring.

7. The torque biasing device of claim 1 further comprising a lubricating liquid which comes in contact with at least one of said input cone, said first output cone, said second output cone, said first friction ring or said second friction ring.

8. The torque biasing device of claim 1 further comprising a cooling liquid which comes in contact with at least one of said input cone, said first output cone, said second output cone, said first friction ring or said second friction ring.

9. The torque biasing device of claim 1 further comprising a viscous liquid which comes in contact with at least one of said input cone, said first output cone, said second output cone, said first friction ring or said second friction ring.

10. The torque biasing device of claim 1 further comprising a friction enhancing liquid which comes in contact with at least one of said input cone, said first output cone, said second output cone, said first friction ring or said second friction ring.

11. The torque biasing device of claim 1 further comprising:
   (a) a first pinion gear, having a first pinion gear axis, and first pinion gear teeth, wherein said first pinion gear is attached to said first output cone along said first output cone axis, such that said first pinion gear axis is co-linear with said first output cone axis;
   (b) a first side gear, having a first side gear axis wherein said first side gear axis is aligned perpendicular to said first pinion gear axis, and further having first side gear teeth, wherein said first side gear teeth are continuously engaged and cooperate with said first pinion gear teeth;
   (c) a second pinion gear, having a second pinion gear axis, and second pinion gear teeth, wherein said second pinion gear is fixedly attached to said second output cone along said second output cone axis, such that said second pinion gear axis is co-linear with said second output cone axis; and,
   (d) a second side gear, having a second side gear axis wherein said second side gear axis is aligned perpendicular to said second pinion gear axis, and further having second side gear teeth, wherein said second side gear teeth are continuously engaged and cooperate with said second pinion gear teeth.

12. The torque biasing device of claim 1 further comprising:
   a. a first pinion gear, having a first pinion gear axis, and first pinion gear teeth;
   b. a first output shaft, having a first output shaft end and a second output shaft end, wherein said first output shaft end of said first output shaft is fixedly attached to said first output cone along said first output cone axis such that said first output shaft is co-linear with said first output cone axis, and said second output shaft end of said first output shaft is fixedly attached to said first pinion gear along said first pinion gear axis such that said first output shaft is co-linear with said first pinion gear axis;
   c. a first side gear, having a first side gear axis wherein said first side gear axis is aligned perpendicular to said first pinion gear axis, and further having first side gear teeth, wherein said first side gear teeth are continuously engaged and cooperate with said first pinion gear teeth;
   d. a first axle shaft, having a first axle shaft end, wherein said first axle shaft end is fixedly attached to said first side gear along said first side gear axis such that said first axle shaft is co-linear with said first side gear axis;
   e. a second pinion gear, having a second pinion gear axis, and second pinion gear teeth;
   f. a second output shaft, having a first output shaft end and a second output shaft end, wherein said first output shaft end of said second output shaft is fixedly attached to said second output cone along said second output cone axis such that said second output shaft is co-linear with said second output cone axis, and said second output shaft end of said second output shaft is fixedly attached to said second pinion gear along said second pinion gear axis such that said second output shaft is co-linear with said second pinion gear axis;
   g. a second side gear, having a second side gear axis wherein said second side gear axis is aligned perpendicular to said second pinion gear axis, and further having second side gear teeth, wherein said second side gear teeth are continuously engaged and cooperate with said second pinion gear teeth; and,
   h. a second axle shaft, having a first axle shaft end and a second axle shaft end, wherein said first axle shaft end is fixedly attached to said second side gear along said second side gear axis such that said second axle shaft is co-linear with said second side gear axis.

13. The torque biasing device of claim 1 further comprising an input shaft having a first input shaft end, wherein the first input shaft end is fixedly attached to said input cone along said input cone axis such that the input shaft and said input cone axis are co-linear.

14. The torque biasing device of claim 1 further comprising a first output torque enhancer means and a second output torque enhancer means, wherein said first and second torque enhancers means are respectively mechanically attached to said first output cone and said second output cones in order to move said first output cone and said second output cone along said first output cone axis and said second output cone axis respectively, so as to independently increase or decrease the space between said first and second output cones respectively and said input cone.

15. The torque enhancer device of claim 14 wherein said torque enhancer is selected from the group consisting of a hydraulic actuator, an electro-mechanical actuator and a magneto-rheologic actuator.

16. The torque biasing device of claim 1 further comprising a means for moving said first output cone axis and said second output cone axis independently either closer to or farther away from said input cone axis, so as to independently increase or decrease the space between said first and second output cones respectively and said input cone.

17. The torque biasing device of claim 1 further comprising a first output torque inducer means and a second output torque inducer means, wherein said first and second torque inducer means are respectively attached to said first output cone and said second output cones in order to induce a torque about said first output cone axis and said second output cone axis respectively, so as to independently increase or decrease the final resultant torque imparted to said first and second output cones.

18. The torque biasing device of claim 17 wherein said torque inducer comprises a hydraulic, a mechanical, an electromechanical or a magneto-rheological actuator.

19. The torque biasing devise of claim 1 further comprising:
   (a) a first output cone rotational speed sensor capable of determining the speed of said first output cone; and, (b) a second output cone rotational speed sensor capable of determining the speed of said second output cone.

20. A method for biasing torque between two shafts comprising the steps of:
   (a) providing a torque biasing device having an input cone, first and second friction rings, first and second output cones and first and second friction ring control means for respectively positioning said first and second friction rings along said first and second output cone outer surfaces;
   (b) detecting first and second output cone rotational speeds and translating said first and second output cone rotational speeds into respective first and second cone speed signals; and,
   (c) comparing said first and second cone speed output signals and varying said first and second friction ring control means independently and iteratively, thus altering said first and second output cone speeds independently so as to make said first cone speed signal substantially equal to said second cone speed signal.

21. A method for biasing torque between two shafts comprising the steps of:
   (a) providing a torque biasing device having an input cone, a first and second friction ring, a first and second output cone and a first and second friction ring control means for positioning said first and second friction rings along said first and second output cone outer surfaces;
   (b) detecting said first and second output cone rotational speeds and interpreting said first and second output cone rotational speeds into respective first and second cone speed signals;
   (c) comparing a ratio of said first and second output cone-speed signals to a biasing optimization variable between and including and,
   (d) varying said first and second friction ring control means independently and iteratively, thus altering said first and second output cone speeds independently so as to make the ratio of said first and second output cone speed signals substantially equal to said biasing optimization variable.

22. A speed matching device comprising:
   (a) an input cone having an input cone axis, an input cone taper angle, and an input cone outer surface, said input cone rotating at an input cone speed about said input cone axis;
   (b) an input cone speed sensing device, capable of detecting said input cone rotational speed and interpreting said input cone speed into an input cone speed signal;
   (c) an output cone, having an output cone axis parallel to said input cone axis, an output cone taper angle equal and opposite to said input cone taper angle, and an output cone outer surface;
   (d) an output cone speed sensing device, capable of detecting said output cone rotational speed and interpreting said output cone speed into an output cone speed signal;
   (e) a driven shaft, rotating at a driven shaft speed;
   (f) a driven shaft speed sensing device, capable of detecting said driven shaft speed and interpreting said driven shaft speed into a driven shaft speed signal;
   (g) a clutch for connecting and disconnecting said output cone and said driven shaft;
   (h) a friction ring having a friction ring inner surface or edge in contact with said output cone outer surface, a friction ring outer surface or edge in contact with said input cone outer surface;
   (i) a friction ring control means for positioning said friction ring along said output cone outer surface;
   (j) a speed matching optimization variable, said variable between and including 0.1 and 10 representing the optimum ratio of output cone speed to driven shaft speed for clutch engagement, given a specific driven shaft speed; and,
   (k) a controller, capable of comparing said output cone speed and said driven shaft speed signals and varying said friction ring control means thus altering said output cone speed so as to make the ratio of said output cone speed signal to said driven shaft speed signal substantially equal to said speed matching optimization variable.

23. The speed matching device of claim 22 further comprising a cooling liquid which comes in contact with at least one of said input cone, said output cone, or said friction ring.

24. The speed matching device of claim 22 further comprising a lubricating liquid which comes in contact with at least one of said input cone, said output cone, or said friction ring.

25. The speed matching device of claim 22 further comprising a friction enhancing liquid which comes in contact with at least one of said input cone, said output cone, or said friction ring.

26. The speed matching device of claim 22 further comprising a viscous liquid which comes in contact with at least one of said input cone, said output cone, or said friction ring.

27. A method for matching the speeds of two rotating shafts comprising the steps of:
   (a) providing a speed matching device having an input shaft, an input cone attached to said input shaft, an input cone speed sensing device, a friction ring, an output cone, a clutch for connecting and disconnecting said output cone and said driven shaft, an output cone speed sensing device, a friction ring control means for positioning said friction ring along said output cone outer surface, a clutch, a driven shaft, and a driven shaft speed sensing device;
   (b) disconnecting the driven shaft from the output cone by disengaging said clutch;
   (c) providing a speed matching optimization variable, said variable between and including 0.1 and 10 representing the optimum ratio of said output cone speed and said driven shaft control speed signals, given a specific driven shaft speed;
   (d) varying said friction ring control means, thus altering said output cone speed, so as to make the ratio of said output cone speed signal to said driven shaft speed signal substantially equal to said speed matching optimization variable; and,
   (e) connecting said output cone to said driven shaft by engaging said clutch.

28. An engine to transmission speed matching device comprising:
   (a) an engine output shaft rotating at an engine speed;
   (b) an input cone attached to said engine output shaft having an input cone axis, an input cone taper angle and an input cone outer surface;
   (c) an output cone having an output cone axis parallel to said input cone axis, an output cone taper angle equal and opposite to said input cone taper angle, and an output cone outer surface;

(d) an output cone speed sensing device, capable of detecting the output cone rotational speed and interpreting said output cone rotational speed into a output cone speed signal;

(e) a transmission input shaft, rotating at a transmission speed;

(f) a transmission speed sensing device, capable of detecting said transmission rotational speed and interpreting said transmission rotational speed into a transmission speed signal;

(g) a clutch allowing said output cone to be connected to said transmission input shaft;

(h) a friction ring having a friction ring inner surface or edge in contact with said output cone outer surface, a friction ring outer surface or edge in contact with said input cone outer surface, and a friction ring control means for positioning said friction ring along said output cone outer surface;

(i) a speed matching optimization variable, said variable between and including 0.1 and 10 representing the optimum ratio of output cone speed to transmission speed, given a specific driveshaft speed; and, (j) a controller capable of comparing said output cone speed and said transmission speed signals and varying said friction ring control means, thus altering said output cone speed, so as to make the ratio of said output cone speed signal to said driveshaft speed signal substantially equal to said speed matching optimization variable.

29. A method for matching the speed of a transmission with the speed of an engine comprising the steps of:

(a) providing a transmission to engine speed matching device having a driven input cone attached to an engine output shaft, a friction ring, a non-driven output cone, a clutch capable of engaging or disengaging a connection between said output cone and said transmission input shaft, an output cone speed sensing device, a friction ring control means for positioning said friction ring along said output cone outer surface, and a transmission speed sensing device;

(b) disconnecting said transmission input shaft from said output cone by disengaging said clutch;

(c) comparing the ratio of said output cone speed and said transmission speed signals to a speed matching optimization variable, said variable between and including 0.1 and 10;

(d) varying said friction ring control means, thus altering said output cone speed iteratively, so as to make the ratio of said transmission speed signal to said output cone speed signal substantially equal to said speed matching optimization variable, and;

(e) connecting said transmission input shaft to the output cone by engaging said clutch.

* * * * *